July 5, 1955  G. C. DI STEFANO  2,712,194
FISHING DEVICE
Filed March 17, 1952
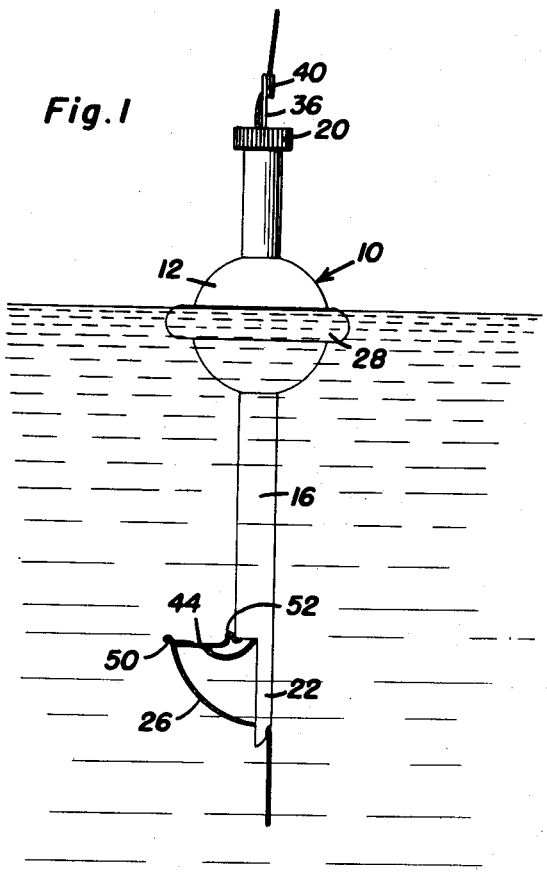
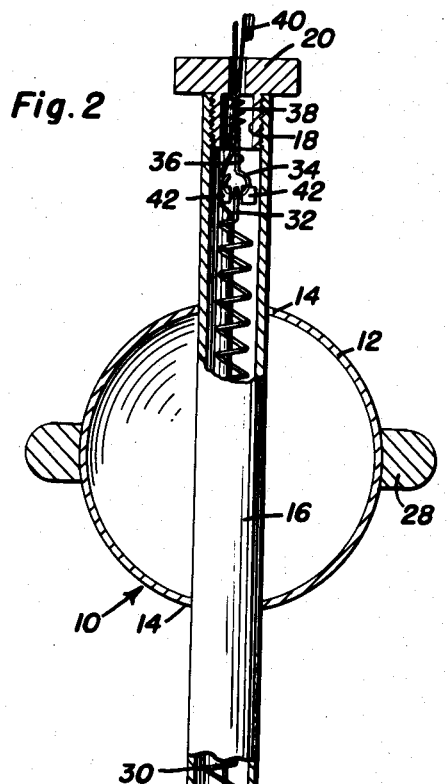
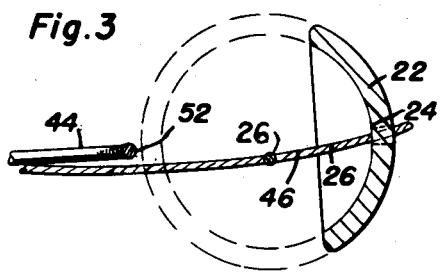
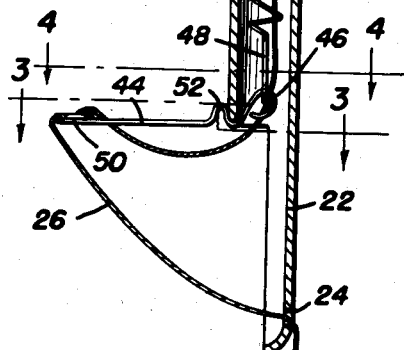
Gioacchino C. DiStefano
INVENTOR.
BY *[signatures]*
Attorneys

United States Patent Office 2,712,194
Patented July 5, 1955

2,712,194

FISHING DEVICE

Gioacchino C. Di Stefano, Kansas City, Mo.

Application March 17, 1952, Serial No. 277,015

1 Claim. (Cl. 43—15)

This invention relates to new and useful improvements in fishing devices and the primary object of the present invention is to provide a line engaging device responsive to pull of a fish on the line for imparting a sudden jerk to the line in order to hook a fish on a hook element attached to the line.

Another important object of the present invention is to provide a fishing device including a float member having a tubular shank in which a line jerking spring is housed and a line holding member attached to the line and engaged with the shank to hold the spring extended until the holding member is released by a slight downward pull on the line, whereupon the spring will contract to jerk the line.

A further object of the present invention is to provide a fishing device of the aforementioned character involving a guide for the line forming an integral part of the shank that will effectively guide the line in order to best actuate the line holding member.

Other objects and advantages reside in the details of construction and operation as more fully hereinafter described and claimed, reference being had to the accompanying drawings forming part hereof, wherein like numerals refer to like parts throughout, in which:

Figure 1 is a side view of the present invention assembled for use;

Figure 2 is an enlarged vertical sectional view substantially through the center of the device shown in Figure 1 parts of the shank being shown in elevation;

Figure 3 is an enlarged transverse horizontal sectional view taken substantially on the planes of section line 3—3 of Figure 2; and Figure 4 is a transverse horizontal sectional view taken substantially on the plane of section line 4—4 of Figure 2.

Referring now to the drawings in detail, wherein for the purpose of illustration, there is disclosed a preferred embodiment of the present invention, the numeral 10 represents a float member including a hollow sphere 12 having vertically aligned apertures 14 that receive a tubular shank 16 which is fixed in the apertures 14.

Shank 16 is provided with an upper internally threaded end that receivably engages the threaded stem 18 of a guide plug 20. The lower end of the shank 16 is formed with an elongated concavo-convexed extension or arm 22 having a line receiving aperture 24 adjacent its lower end portion. The edges defining the aperture 24 are smoothly rounded to prevent cutting or shredding of the line 26 slidably received therein.

In order to increase the floatability of the float member 10, the sphere 12 is embraced by a buoyant ring 28 that will also aid in retaining the shank 16 substantially vertical.

A coil spring 30 extends axially through shank 16 and its upper hook end 32 is engaged with the lower hook end 34 of a wire length 36 having an intermediate coil portion 38 and an upper looped portion 40. The hook end 32 extends upwardly between a pair of lugs 42 fixed within the upper portion of shank 16. The lugs are provided with seats in which the hook 34 is positioned.

An elongated wire holding member 44 is provided with a loop 46 at one end that engages the lower hook end 48 of coil spring 30. The other end of the member 44 is formed with a spiral loop 50 between two convolutions of which is received the line to retain the line engaged with the holding member. The member 44 is bent adjacent the loop 46 to form a laterally projecting offset portion 52 that will engage the lower end of the shank 16 at a point diametrically opposite from the arm 22.

In practical use of the present invention, the line 26 is extended axially through the spring 30, the coil portion 38 and the plug 20. The line 26 is also engaged between adjacent convolutions of the loop 50 and extends through aperture 24. When the offset portion 52 is engaged with the lower end of shank 16, as shown in Figure 2, the spring 30 is extended.

Bait is applied to a hook (not shown) at the lower end of the line 26 so that when a fish strikes at the hook, the line 26 below the loop 50 will be pulled downwardly to disengage the member 44 from shank 16, whereupon the spring 30 will pull the line 26 and member 44 upwardly to hook the fish.

Coil portion 38 is larger in diameter than the aperture in the upper wall of the plug 20 to retain hook 34 against the lugs 42 during upward movement of the line as the coil spring is contracted.

Arm 22 constitutes a guide for the line and also constitutes a guide channel for the member 44.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A fishing device comprising a float member including a sphere having vertically aligned apertures therein forming an opening therethrough, a tubular shank extending through and fixed in said opening and having upper and lower ends, a coil spring extending through said shank, a plug having an aperture therethrough secured to the upper end of said shank, a wire member having a hook end, said coil spring engaging said hook end, a pair of spaced lugs attached to said shank, said coil spring extending between said lugs, said lugs having seats, said hook end being positioned in said seats, said wire member having an intermediate coil portion of larger size than said aperture preventing said wire member from being removed through the aperture in said plug, an elongated holding member attached to the lower end of said spring and including a wire length having an offset portion engageable with the lower end of said shank to retain the holding member perpendicular to the shank when the coil spring is expanded, said holding member terminating in a convoluted portion remote from said spring, and a fishing line extending through said aperture and through said shank and having a portion engaged between a pair of adjacent convolutions of said convoluted portion whereby said device is adjustably mounted on said fishing line and when the line is pulled downwardly, said offset portion is released from the shank and the spring will pull the line and holding member upwardly with a jerk to hook a fish on the line, said lugs preventing said spring from rotating to thus become entangled with said fishing line.

References Cited in the file of this patent

UNITED STATES PATENTS

| | | |
|---|---|---|
| 155,266 | Sprague | Sept. 22, 1874 |
| 541,354 | Hartmann | June 18, 1895 |
| 542,917 | Bardsley | July 16, 1895 |
| 1,295,448 | Dingwall | Feb. 25, 1919 |
| 1,614,931 | Pennell | Jan. 18, 1927 |
| 2,286,743 | Ladd | June 16, 1942 |
| 2,481,453 | Stadelhofer | Sept. 6, 1949 |
| 2,631,399 | Sowa | Mar. 17, 1953 |